March 26, 1940.  G. R. BOTT  2,195,164
SAFETY RAZOR
Filed March 6, 1937
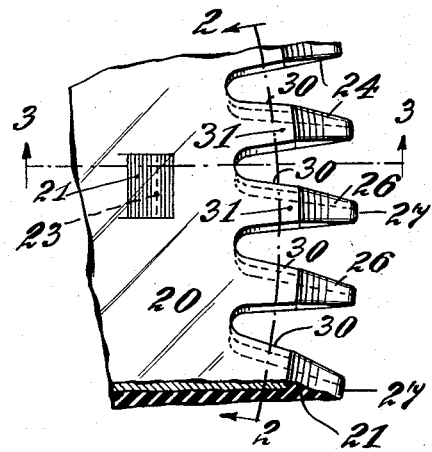
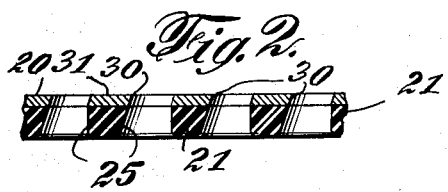
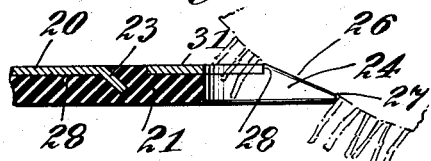
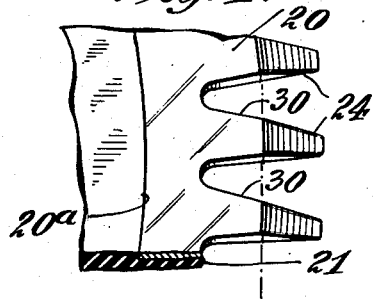
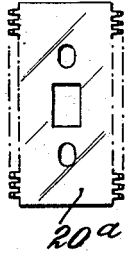
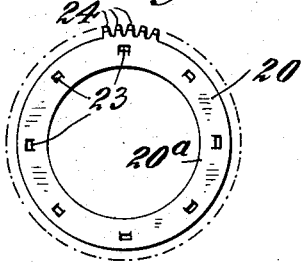
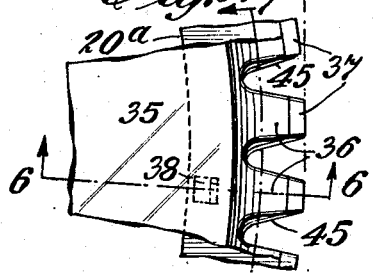
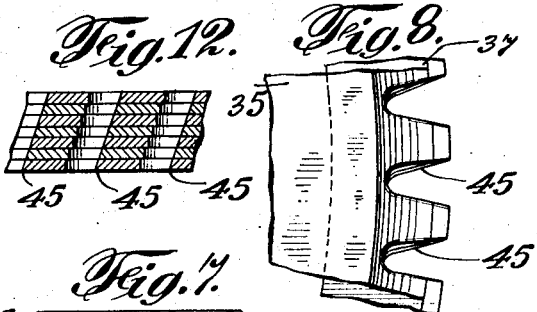
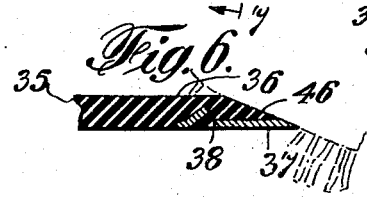
INVENTOR.
George R. Bott
BY
his ATTORNEY.

Patented Mar. 26, 1940

2,195,164

UNITED STATES PATENT OFFICE 2,195,164

SAFETY RAZOR

George R. Bott, Stamford, Conn.; The Stamford Trust Company, executor of said George R. Bott, deceased Application March 6, 1937, Serial No. 129,452

1 Claim. (Cl. 30—43)

This invention relates to razors, and more particularly to the kind as shown and described in my copending application Serial Number 90,060 filed July 11, 1936, and has for its particular object to provide a novel method of making the cutting members in which the teeth thereof have cutting edges on one or both sides, and in which the member is molded from a material such as Bakelite or synthetic resinous material, with various paper, linen or other inclusions or the like, and which molded portion is laminated with a thin metal plate of high grade steel or the like, which metal plate serves to provide the cutting edges.

By the use of this method, these cutting members may be manufactured at a very low cost, since such plastic material is inexpensive and yet durable; the metal plate being made of high grade steel and being relatively small, essentially sufficiently large enough to provide the cutting edges, the cost of the entire cutting member is kept very low, while at the same time the molded material has rounded or broken edges and needs no finishing or buffing operation. The metal plates themselves may be stamped and the square edges resulting therefrom may be removed by grinding to form keen cutting edges, the ground plate being then molded with Bakelite. Or the stamped plate without grinding can be applied to a molded Bakelite member, and both the Bakelite member and the metal plate ground to form keen cutting edges. A plurality of superimposed plates such as shown in Fig. 12 may be subjected to a grinding operation at the same time to provide keen cutting edges.

The invention, therefore, consists of the novel method of making these thin, laminated cutting members, and also in the novel structure of part molded, part metal cutter members as a new article of manufacture.

The invention herein to be described is applicable both to circular razor cutters such as is described in my copending application, and also to the standard type of rectangular shaped safety razors of the vibrating type.

The invention will be more fully described hereinafter, embodiments thereof shown in the drawing, and the invention will be finally pointed out in the claim.

In the drawing, wherein like symbols refer to like or corresponding parts throughout the several views, Fig. 1 is a plan view of a part of a bottom cutting member of my improved razor, Fig. 2 is a radial section taken on line 2—2 of Fig. 1, Fig. 3 is a section of Fig. 1 on line 3—3 thereof, Fig. 4 is a plan view of a part of a bottom member of another modification, Fig. 5 is a plan view of a top cutting member, Fig. 6 is a section of Fig. 5, taken on line 6—6 thereof, Fig. 7 is a section of Fig. 5 on line 7—7 thereof, Fig. 8 is a plan view of another modification of the top member, Fig. 9 is a plan view of a rectangularly shaped cutter, Fig. 10 is a plan view of a circularly shaped cutter, Fig. 11 is a section of the blank, used to form the cutting edges, and Fig. 12 is a section of a plurality of metal blanks superimposed upon each other, and edges sharpened to form shearing teeth.

Referring to the drawing, a bottom member of my improved razor is shown in Fig. 1 and in Fig. 4, and a top member is shown in Figs. 5 and 8. While these are of circular shape as shown in Fig. 10, they may be made in rectangular form with teeth on two sides, as shown in Fig. 9.

These top and bottom members are made of Bakelite or the like, laminated with thin metal plates which provide the cutting edges.

The thin metal plates for this purpose may be made in various ways; one way, for example, is to stamp a metal plate and then grind it to form cutting edges, as shown in Fig. 11. Or, the stamped plates can be placed one on top of the other, and the edges ground, while the plates are superimposed, as shown in Fig. 12. Or the stamped plates without the cutting edges can be attached to the Bakelite during the molding, and then the Bakelite can be ground off where necessary and the cutting edges can be ground on the plate, in one operation.

Assuming that the plates of Fig. 11 are first cut to lateral cutting edges, then either such a plate or a plate such as shown in Fig. 12, is taken and placed in a position in a mold (not shown), and thereupon a plastic material such as Bakelite, is put into the mold. The metal plates are provided with sprung up portions, which mold with the material, and thereby the thin metal plate is anchored to the Bakelite plate or lamina. Or, the metal plates or laminae may be connected to the material, as shown in Fig. 4 and Fig. 8, by cement or the like.

In Figs. 1, 3 and 6 is shown the thin metal plate 20, and the Bakelite portion 21. The anchor member 23 is bent downwardly so as to anchor the metal plates 20 and 37 to the Bakelite portions 21 and 36.

The teeth of the Bakelite plate are indicated by 24 and have converging walls 25 to enable their release from the molds. The smooth teeth 24 act as combs for the hairs to be cut. They also have an angular face 26, which is at an inclination to the bottom plane, and the tips are rounded as at 27. Embedded in a recess 28 is the metal plate 20.

The thin metal plate 20 has cutting edges 30, at one side of each tooth of the plate when in circular form, and at both sides of each tooth when the cutting head is rectangular. Even when in circular shape, each tooth can be provided with two cutting edges. These cutting edges are formed by the intersection of two planes at an acute angle, the planes passing through the sides of the teeth. The plane of rotation is at right angles to the hair to be cut, and in case of a rectangular razor cutting set, the plane of reciprocation or vibration is at right angles to the axis of the hair to be cut. This plane forms the side 31 of the metal plate 20.

The Bakelite holding member can also be molded separately to shape as shown, and the toothed metal plate 20 can be cemented thereto by suitable cement.

The top cutting members 35, as shown in Figs. 5 and 8, can be similarly made. In this case, the Bakelite holding member 36 has the metal plate 37 at its periphery and may be secured thereto by the pressed out member 38 or by cementing.

The metal plate 20 is shown in Figs. 4 and 5 made of a circular metal band 20a, though the width is not material. In a rectangular razor head, this metal band may extend from side to side and have the teeth on its parallel sides. Two bands molded into a Bakelite holding member may be used. In Figs. 1 and 8 the metal plate is in the form of a disc.

The cutting edge of the top plate is shown in Fig. 7, as also in Figs. 5, 8, and 12, by 45.

The skin contacting sides are shown by 26 of the bottom plate of Fig. 3, and the skin contacting side 46 of the top plate 35, are in a single plane; when the top plate is placed upon the bottom plate. In the line between Fig. 4 and Fig. 5, the edge of the top plate is shown as in alignment with the periphery of the metal plate 20 of the bottom member shown in Fig. 4.

In Fig. 9 is shown a movable cutter 20a, of standard, hand-operated safety razor shape.

From the drawing it will be seen that in Figure 3 the metallic member 20 has an exposed face, and in Figure 2 it is seen that this face has two lateral sides, this face and these sides forming the cutting edges, as seen in Figure 2. Similarly, in Figure 6, there is an exposed face 37, and this has lateral sides which in Figure 7 show the cutting edges 45. At least one side of the metallic teeth, and one side of the molded teeth, are in a plane, as seen from Figures 2 and 7. When the parts shown in Figures 4 and 5 are placed on top of each other, the metallic exposed faces of the teeth and the body portion of the metallic plates will rub against each other, whereas, when the razor is applied to the face, the face will contact with the side 46 in Figure 6. The plane which passes through this tapering surface of the member 37, also passes through the part 46 of Figure 6, and the part 26 of Figure 3; thus the apex 27, face 26 of Figure 3, and the tapering surface of the metallic plate 37, and the face 46 of Figure 6, are all in one line. Save for the exposed faces of the thin metallic plates and their lateral sides which form therewith the cutting edges, and the very small tapering side of the member 37, the metallic plates are embedded in the molded material and enclosed thereby.

From the foregoing, it will be seen that a very simple and inexpensive method of making blades has been described. Bakelite or the like has a very low cost, and only so much high grade cutting edge metal need be used as to satisfy the teeth forming portions which provide the cutting edges.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations, modification and adaptations as come within the scope of the appended claim.

I claim:

The combination of a pair of composite cutter members for razors, one of said members consisting of a thin metallic plate having marginal teeth, and a plastic material molded upon said plate and teeth, leaving one face and two adjacent sides of the teeth of the metallic plate exposed, and the other member consisting of a thin metallic plate having marginal teeth and a plastic material molded upon said plate and teeth, leaving one face, two adjacent sides and a side opposite the first side and inclined to the face exposed, the thickness of the molded material in each member being a multiple of the thickness of the plate, the exposed sides of the plates facing each other, one side of the teeth of the molded material of each cutter member and the exposed inclined side of the metallic teeth being in a plane, forming a composite skin-engaging surface, and tongues formed in each metallic plate and embedded within the molded body portion, whereby the cutting action is obtained by the edges formed by the exposed faces and adjacent sides of the metallic teeth, said teeth and their metallic plates being substantially enclosed by the molded material save for the aforesaid exposed parts, and contact with the face is made largely by the molded material.

GEORGE R. BOTT.